Figure 1:
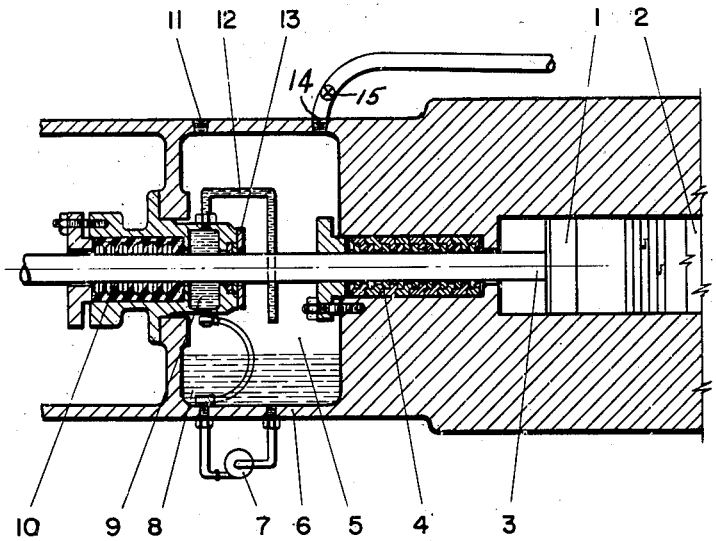

March 29, 1949. G. E. CARTIER 2,465,633
GAS SEAL FOR RECIPROCATING RODS
Filed June 14, 1947

INVENTOR
G. E. Cartier.

Patented Mar. 29, 1949

2,465,633

UNITED STATES PATENT OFFICE 2,465,633

GAS SEAL FOR RECIPROCATING RODS

Georges E. Cartier, Shawinigan Falls, Quebec, Canada, assignor to Shawinigan Chemicals Limited, Montreal, Quebec, Canada, a corporation of Canada Application June 14, 1947, Serial No. 754,762

5 Claims. (Cl. 286—19)

Introduction

This invention relates to means for sealing reciprocating rods, such as piston rods, where such rods pass linearly into a chamber that must be sealed against escape of gases contained therein.

Prior art

The problem of obtaining gas-tight seals in stuffing boxes around reciprocating rods has never heretofore been satisfactorily solved. Various types of mechanical seals, with sealing surfaces machined to fit each other, are available, but all such seals are limited in their effectiveness by the limitations on machining of parts to conformity. Even though machined parts "wear in" to fit, the fit is never a perfect seal for gases. The frequent smell of ammonia around ammonia compressors is evidence that such seals are far from perfect. There is considerable risk of accumulation of explosive vapors where gases such as ethylene are being compressed, if there is the slightest leak of gas through the seals. Besides the danger of explosions and the odium of odoriferous or lethal gases, gas losses through imperfect seals also involve considerable expense, particularly where expensive gases, such as ethylene, are being lost.

Objects

It is accordingly an object of this invention to provide an improved sealing means whereby reciprocating rods may be sealed at their points of entry into gas chambers, thereby preventing the escape of gas from the gas chamber or cylinder around the reciprocating rod. It is a further object of this invention to provide a sealing means, as aforesaid, which can be adapted for use on reciprocating rods that operate linearly in a horizontal, or vertical, or oblique direction. It is a further object of this invention to provide a sealing means, as aforesaid, which can be readily, easily, and inexpensively fabricated. It is a still further object of this invention to provide a sealing means, as aforesaid, which requires minimum maintenance after installation, and requires no adjustment after its installation and initial adjustment. Further objects and useful advantages of the invention will be apparent from the following description and accompanying drawings.

The invention

The invention consists essentially of a reduced-pressure gas chamber and a liquid seal in the form of liquid chamber, in open communication therewith through both of which the piston rod passes, interposed between the gas to be sealed under pressure and an outside mechanical seal that prevents escape of liquid from the liquid chamber to the atmosphere. The invention is based upon the fact that it is simpler and much easier to contain liquids under pressure than it is to contain gases under pressure.

The liquid seal of this invention has been conveniently used, without modification, to "break" to atmosphere, pressures up to the order of 50 lbs. per square inch. Where pressures of higher value are to be sealed it is necessary to "break" the pressure by stages to a value below about 50 lbs. per square inch before sealing with the liquid seal according to this invention. "Breaking" or reducing the pressure is easily done by using one of the common commercial types of metallic sealing rings or other packing material. Thus, pressures of 450–500 lbs. per square inch can be "broken" or reduced to near atmospheric by the use of five or six metallic sealing rings or other mechanical sealing device, and the reduced pressure sealed from the atmosphere by the liquid seal, according to this invention.

The invention will be better understood when reference is made to the accompanying drawings and the ensuing description thereof.

Figure 1 of the drawings illustrates the application of the invention to a horizontally reciprocating piston rod in a common gas compressor.

Figure 2:
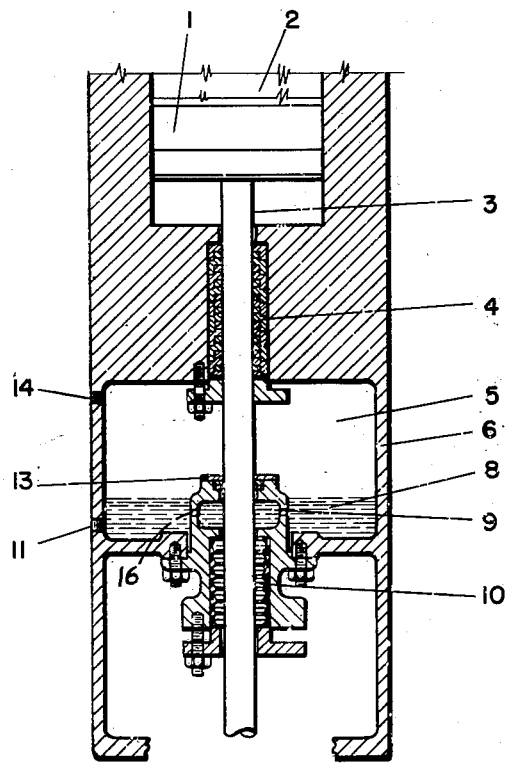

Figure 2 of the drawings illustrates the application of the invention to a vertically reciprocating piston rod in a common gas compressor.

Referring particularly to the details of Figure 1, 1 represents a compressor piston operating in cylinder 2. The valve details of the cylinder have been omitted. 3 represents the reciprocating rod driving the piston, and is the rod around which the seal is to be made. A series of sealing rings, 4, represent the means used to "break" or reduce the pressure differential of the gas from the cylinder so that there is a pressure between the liquid seal and the atmosphere of from 0 to about 50 lbs. per square inch. The chamber 5 is formed by the enclosure 6, which is in the form of an extension of the cylinder or a trunk-piece sealed to the cylinder. The chamber 5 is vented through vent 14, so that gas does not accumulate in the chamber. The chamber 5, as illustrated, may also act as a reservoir or sump for the sealing liquid. The vent 14 conveniently leads to the intake of the compressor so that the gas is returned to the system, but where such immediate recovery is not essential, the chamber is vented to any suitable point of collection. The small circulation pump 7 circulates the sealing liquid from the sump to the sealing chamber 9 through which the piston rod passes. The pump maintains a supply of liquid overflowing from the chamber 9, the overflow liquid being directed back to the sump by the overflow pipe 12. The mechanical seal 10 seals the liquid in chamber 9 from the atmosphere. There is thus a continuous body of liquid separating the gas in chamber 5 from the piston rod at the point where the rod travels out into the atmosphere. Hence, the only possible loss of gas from chamber 5 to the atmosphere around the piston rod is a loss of gas dissolved in sealing liquid escaping through mechanical seal 10.

Through plug 11 the amount of liquid in chamber 5 may be maintained constant by any required additions, either manually or automatically.

13 represents a mechanical wiper which keeps the rod in chamber 5 free of excess liquid from chamber 9. The level of liquid in chamber 5 is kept below the portion of the rod that is travelling back and forth in chamber 5, to ensure that no liquid is carried into the sealing rings 4 and the cylinder 3.

Referring now to the details of Figure 2, the reference numbers indicate the same relative parts indicated by the same reference numbers in Figure 1. With the piston rod operating vertically, the liquid in chamber 5 accumulates at the bottom, opposite the sealing rings 4. Hence no circulating pump is necessary, chamber 9 being maintained full by open contact as at 16 with the liquid 8 in chamber 5. Obviously chamber 9 in this position has no essential purpose, and is shown only to indicate the use of the same casting used for a rod operating in a horizontal direction. The mechanical wiper 13 performs the same function of keeping the piston rod in chamber 5 free of excess liquid from chambers 9 and 5.

Where a reciprocating rod operates at an oblique angle, the circulating pump 7 of Figure 1 may or may not be necessary, depending on the angle of repose of the liquid in chamber 5. As long as liquid surrounds the piston rod at the point where it enters chamber 9 from the atmosphere, forced circulation with pump 7 is unnecessary.

In all applications of the sealing means of this invention to reciprocating rods, it is recommended that the dimensions of the chamber for the sealing liquid, corresponding to chamber 5 in the drawings, be so related to the length of the piston stroke that no point on the reciprocating rod that is subject to wear by mechanical gas sealing rings reaches a position where it is exposed to the outer mechanical liquid sealing means. In other words, the axial spacing between the mechanical sealing means 4 and the mechanical sealing means 10 is at least as great as the length of the normal operating stroke of the shaft 3. This precaution is desirable so that if the diameter of the reciprocating rod is reduced by wear, the worn portion of the rod will not increase the load on the liquid seal nor cause excess leakage of the sealing liquid into the outer mechanical seal.

A number of different liquids are suitable for use as the sealing medium of this invention. Any inert liquid that will not rapidly nor appreciably dissolve the gas being sealed and at the same time will lubricate the moving parts, is a suitable liquid. The common grades of commercial petroleum lubricating oils have been found to be particularly suitable, the most suitable oil for each specific seal being that one which will provide the best lubrication as well as act as a sealing medium at the operating temperature of the sealing means. The inert liquid organo-silicon lubricants known as silicone lubricants are also suitable sealing liquids for the purposes of this invention. Preferably, the same liquid is used as is used for the lubrication of the surrounding moving parts.

Advantages

The invention has been found to be particularly effective when applied to the piston rods of compressors used for compressing refrigerating gases. One application has been found to eliminate losses of 400 pounds per month of ethylene from an ethylene compressor formerly fitted with a mechanical seal of the metallic packing ring type.

The gas seals of piston rods in refrigeration compressors are subject to an unusual demand, in that they are required to seal the rod over a wide range of sometimes rapidly varying temperatures. The wide range of rapidly varying temperatures is due to the fact that liquified refrigerant, entrained in or injected into the gaseous refrigerant, frequently settles on the piston and rod of the compressor, and causes rapid local cooling and contraction as it evaporates. The efficiency of the liquid sealing medium of this invention is not affected by such an unusual demand. Because of its fluidity, the sealing liquid in this invention readily compensates for any shrinkage or expansion of the member to be sealed, whereas mechanical seals, because of their rigidity, cannot possibly compensate as readily for changes in the dimensions of the member to be sealed.

Operation of the sealing action of this invention is simplified by the fact that leaks of liquid from a mechanical seal, corresponding to 10 in the drawings, are easily collected and returned to the system, which contrasts with the impossibility of collecting and returning gas which leaks through conventional seals into the atmosphere.

A further distinct advantage is obtained by the application of this invention to compressor piston rods where the suction pressure of the compressor is below atmospheric pressure. Under such conditions, it has long been a difficult problem to prevent air from entering the compressor during the suction strokes of the piston. The seal of this invention may be used in conjunction with a proper system of venting to prevent all losses of gas being compressed and also to prevent any undesirable intake from the surrounding atmosphere.

Where a compressor is equipped with the sealing means herein described, including a chamber, corresponding to chamber 5 of the drawings, vented to the suction intake of the compressor, a control valve 15, inserted in the vent line so as to vent the chamber only as long as its pressure is above atmospheric will maintain positive pressure in the chamber at all times. This positive pressure is easily contained by the liquid seal of this invention, so that no loss of gas occurs around the piston rod of the compressor, and the positive pressure prevents any ingress of air to the system around the piston rod. Thus, during the suction strokes of the piston, when the cylinder is at a pressure below atmospheric, only gas from the chamber corresponding to 5 can leak back into the cylinder around the piston rod through the pressure-reducing seal, and the system is maintained free of undesirable inert gases.

Throughout the specification and appended claims, numerical values of pressure are gauge pressures unless otherwise specified.

I claim:

1. A gas sealing device for a reciprocating shaft passing linearly into an enclosure to be sealed against loss of gas therefrom, comprising in combination a first mechanical sealing means at the point where the shaft leaves the enclosure containing gas under pressure, means forming a first chamber surrounding a portion of the shaft adjacent the first mechanical sealing means, means forming a second chamber surrounding a portion of the shaft adjacent the first chamber and in liquid communication therewith, said second chamber being spaced from said first mechanical sealing means by at least a portion of said first chamber, said second chamber containing an inert liquid that surrounds and is in contact with the shaft, a second mechanical sealing means adjacent the second chamber and positioned outwardly therefrom, the axial spacing between said first and second mechanical sealing means being at least as great as the length of the normal operating stroke of said shaft, and a vent from said first chamber to a point of gas recovery.

2. A gas sealing device according to claim 1 including pressure-actuated means in the vent to open the vent only when the first chamber is at a pressure above atmospheric.

3. A gas sealing device according to claim 1 wherein the shaft reciprocates substantially horizontally, and including a liquid circulating system comprising liquid circulating means, a liquid inlet to the second chamber connected to the said circulating means, a liquid outlet from the second chamber into the first chamber and a liquid outlet from the first chamber into the circulating means.

4. A gas sealing device according to claim 1 wherein the shaft reciprocates substantially vertically and wherein said first chamber is partially filled with the inert liquid and is in liquid communication with said second chamber through openings in said second chamber, the vent in said first chamber being above the level of liquid therein.

5. A gas sealing device according to claim 1 having means for removing excess inert liquid from the surface of the portion of the shaft in the first chamber.

GEORGES E. CARTIER.

REFERENCES CITED

The following references are of record in the file of this patent:

UNITED STATES PATENTS

| Number | Name | Date |
| --- | --- | --- |
| 606,430 | Sedlacek | June 28, 1898 |
| 719,460 | Goosmann | Feb. 3, 1903 |
| 909,479 | Thwing | Jan. 12, 1909 |
| 1,375,376 | Fynn | Apr. 19, 1921 |
| 1,681,075 | Wiegert | Aug. 14, 1928 |
| 1,759,074 | Van Rijswijk | May 20, 1930 |
| 1,971,542 | Taylor | Aug. 28, 1934 |
| 2,064,703 | Van De Graaff | Dec. 15, 1936 |
| 2,143,637 | Vollmann | Jan. 10, 1939 |